UNITED STATES PATENT OFFICE 2,678,334

PROCESS FOR THE PREPARATION OF BIS-ISOPROPYL - AMINO-FLUORO-PHOSPHINE OXIDE

Gilbert Spencer Hartley, Fulbourn, Denis William Pound, Harston, Dennis Frederick Heath, Cambridge, and Joseph Mills Hulme, Saffron Walden, England, assignors to Pest Control Limited, Bourn, England, a British company No Drawing. Application May 8, 1951, Serial No. 225,264

Claims priority, application Great Britain May 12, 1950

6 Claims. (Cl. 260—543)

This invention relates to organic phosphorus-containing compounds.

The present invention provides a process for the manufacture of bis-isopropylamino-fluoro-phosphine oxide

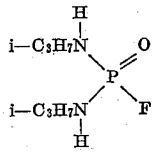

wherein isopropylamine is mixed with phosphorus oxychloride in the presence of an inert anhydrous organic solvent and the product obtained is treated with a strong aqueous solution of potassium fluoride or ammonium fluoride.

Preferably the mixture contains between 3.5 and 5 and most preferably between 4 and 4.1 mols of isopropylamine per mol of phosphorus oxychloride.

Preferably the solvent is chosen from acetone and the chlorinated hydrocarbons boiling between 40° and 100° C.

It will be noticed that a large excess of the isopropylamine is used. This is for the purpose of forming sufficient isopropylamine hydrochloride to react with the potassium or ammonium fluoride used later with the formation of the corresponding fluoride, i. e. a fluoride of the amine. The amine fluoride then reacts with the initially formed isopropylamine chlorophosphine oxide to form the inorganic chloride and the bis-isopropylaminofluorophosphine oxide which is the desired end product of the present process.

The reactions can be stated as follows:

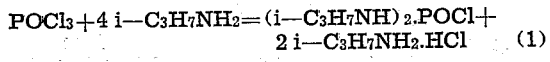

On heating this reaction mixture, which contains one mol of the chlorophosphine oxide and at least two mols of the i-propylamine hydrochloride, with a slight molar excess of an inorganic highly water-soluble fluoride, such as KF or NH₄F, the following reaction takes place

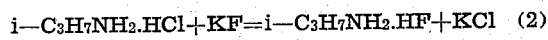

As the isopropylamine hydrofluoride thus formed is soluble in the organic solvent it is able to exchange further in that phase, exchanging its fluorine against the chlorine of the bis-isopropylamino chlorophosphine oxide as per the following equation:

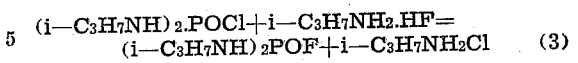

It is for this reason that at least 3.5 mols of the isopropylamine are employed for each mol of the phosphorus oxychloride.

The following examples illustrate the invention:

1. To 76.5 gms. of phosphorus oxychloride was added 300 ml. of chloroform. This was mechanically agitated, and cooled to maintain the temperature at 18° to 22° C. during the addition of 118 gms. of isopropylamine.

To the product, after cooling to 0° C., was added 32 gms. of anhydrous potassium fluoride dissolved in 30 ml. of water. The temperature rose quickly to 18° C. and remained at 18° C. during 20 minutes' agitation.

The resulting mixture was washed with 230 ml. of water, and the organic layer washed with two portions of 20 ml. of water each.

Chloroform was removed from the organic layer by vacuum distillation, and the residue stirred with 200 ml. of 40° to 60° C. petroleum ether until crystalline.

The yield was 73 gms. of substantially pure bis-isopropylamino-fluoro-phosphine oxide.

In this example, the 76.5 gms. of POCl₃ (mol. wt. 153.40) is one-half mol thereof, and 118 grams of the isopropylamine (mol. wt. 59.08) is 2 mols thereof, and the 32 grams of anhydrous KF (mol. wt. 58.10) is slightly more than one-half mol thereof. From this it can be seen that for each full mol of POCl₃ four mols of the isopropylamine and a slight molar excess of the inorganic fluoride are used.

2. 76 gms. of phosphorus oxychloride was added to 400 ml. of carbon tetrachloride. This was mechanically agitated and cooled to maintain the temperature at 18° to 22° C. during the addition of 118 gms. of isopropylamine. To the product after cooling to 0° C. was added 32 gms. of anhydrous potassium fluoride dissolved in 30 ml. of water. The temperature rose to 20° C. and the mixture was stirred for 20 minutes after reaching this maximum temperature. The product was isolated as in Example 1, the yield being in this case 66 gms. of substantially pure bis-isopropylamino-fluoro-phosphine oxide.

3. 76 gms. of phosphorus oxychloride was added to 350 ml. of trichloroethylene. This was mechanically agitated and cooled to maintain the temperature at 18° to 22° C. during the addition of 118 gms. of isopropylamine. To the product after cooling to 0° C. was added 32 gms of anhydrous potassium fluoride dissolved in 30 ml. of water. The temperature rose to 20° C. and the mixture was stirred for 20 minutes after reaching this maximum temperature. The product was isolated as in Example 1, the yield being in this case 70 gms. of substantially pure bis-isopropylamino-fluoro-phosphine oxide.

The pure product was obtained by recrystallisation of the product obtained according to the above examples from glycol diacetate, and the purity of the product, which was a white crystalline solid, was established by: (a) constancy of partition co-efficient (4.3:1 in favour of chloroform at 20° C. and less than 0.1% concentration), determined with a radio-active specimen, between chloroform and water on successive extractions and (b) recrystallisation from glycol diacetate giving a constant melting point of 65° C. Composition was established by titration of isopropylamine liberated by alkaline distillation after acid hydrolysis, determination of phosphoric acid by the molybdenum blue method after acid hydrolysis, and determination of alkali consumed during hydrolysis to fluoride and bis-(mono-isopropylamino) phosphonous acid, making correction in this latter case for a small amount of hydrolysis to isopropylamine and ortho-phosphate.

Bis-isopropylamino-fluoro-phosphine oxide can be obtained in high yield by the process of the present invention. Its relatively high melting point favours ease of preparation and it has the further great advantage that while toxic to insects it is very much less toxic to mammals than bis-dimethylamino-fluoro-phosphine oxide.

The expression "strong aqueous solution" as used herein refers in the case of potassium fluoride to an aqueous solution containing at least 15 gms. of anhydrous potassium fluoride (KF) per 100 gms. of solution and in the case of an ammonium fluoride to an aqueous solution containing at least 10 gms. of anhydrous ammonium fluoride ($NH_4F$) per 100 gms. of solution.

What we claim is:

1. A process for the manufacture of bis-isopropylamino-fluoro-phosphine oxide which comprises mixing at least 3.5 mols of isopropylamine with about 1 mol of phosphorus oxychloride in the presence of an inert anhydrous organic solvent and treating the products obtained with a strong aqueous solution containing at least 1 mol of a water-soluble inorganic fluoride selected from the group consisting of potassium fluoride and ammonium fluoride.

2. A process for the manufacture of bis-isopropylamino-fluoro-phosphine oxide which comprises mixing from about 3.5 to 5 mols of isopropylamine with about 1 mol of phosphorus oxychloride in the presence of acetone and treating the product obtained with a strong aqueous solution containing at least 1 mol of a water-soluble inorganic fluoride selected from the group consisting of potassium fluoride and ammonium fluoride.

3. A process for the manufacture of bis-isopropylamino-fluoro-phosphine oxide which comprises mixing from about 3.5 to 5 mols of isopropylamine with about 1 mol of phosphorus oxychloride in the presence of a chlorinated hydrocarbon boiling between 40° and 100° C. and treating the product obtained with a strong aqueous solution containing at least 1 mol of a water-soluble inorganic fluoride selected from the group consisting of potassium fluoride and ammonium fluoride.

4. A process for the manufacture of bis-isopropylamino-fluoro-phosphine oxide which comprises mixing between 3.5 and 5 molecular proportions of isopropylamine with one molecular proportion of phosphorus oxychloride in the presence of an inert anhydrous organic solvent and treating the product obtained with a strong aqueous solution containing at least 1 mol of a water-soluble inorganic fluoride selected from the group consisting of potassium fluoride and ammonium fluoride.

5. A process for the manufacture of bis-isopropylamino-fluoro-phosphine oxide which comprises mixing between 4.0 and 4.1 molecular proportions of isopropylamine with one molecular proportion of phosphorus oxychloride in the presence of an inert anhydrous organic solvent and treating the products obtained with a strong aqueous solution of a water-soluble inorganic fluoride selected from the group consisting of potassium fluoride and ammonium fluoride, said solution containing about 1 mol of said fluoride.

6. Process for the manufacture of bis-isopropylamino-fluoro-phosphine oxide which comprises reacting between 3.5 and 5 mols of isopropylamine while dissolved in an organic solvent with about one mol of phosphorus oxychloride with the formation of a mol of bis-isopropylaminochlorophosphine oxide and 2 mols of isopropylamine hydrochloride, and further reacting the mixture with a strong aqueous solution containing a slight molar excess of an inorganic fluoride from the group consisting of potassium fluoride and ammonium fluoride with the resulting conversion of the isopropylamine hydrochloride into isopropylamine hydrofluoride and the reaction of the latter with the previously formed bis-isopropylaminochlorophosphine oxide to form bis - isopropylamino - fluoro - phosphine oxide, and recovering the latter.

References Cited in the file of this patent

UNITED STATES PATENTS

| Number | Name | Date |
| --- | --- | --- |
| 2,146,356 | Schrader et al. | Feb. 7, 1939 |
| 2,502,966 | Kosolapoff | Apr. 4, 1950 |

FOREIGN PATENTS

| Number | Country | Date |
| --- | --- | --- |
| 602,446 | Great Britain | May 27, 1948 |

OTHER REFERENCES

Michaelis Liebig's Annalen, vol. 326, pp. 175–176 (1903).

P. B. 95312, p. 16 (1947).